Sept. 25, 1928.  S. B. HASELTINE  1,685,160

ANTIFRICTION BEARING

Filed Sept. 12, 1923

Witnesses
Wm. Geiger

Inventor
Stacy B. Haseltine
By George I. Haight
Atty.

Patented Sept. 25, 1928.

1,685,160

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

ANTIFRICTION BEARING.

Application filed September 12, 1923. Serial No 662,215.

This invention relates to improvements in anti-friction bearings.

One object of the invention is to provide an anti-friction bearing of simple, efficient and economical construction employing a rolling anti-friction element which is automatically self-centering under the influence of gravity and wherein constant height is maintained, the bearing being especially adapted for use as a side bearing on railway cars.

A specific object of the invention is to provide an anti-friction side bearing employing a rolling anti-friction element proper, wherein said element and its retaining member have co-operating portions so designed as to maintain a predetermined relation between said element and retaining member in all positions of said element, said means also co-operating to maintain the parts of the bearing in assembled relation.

Figure 1:
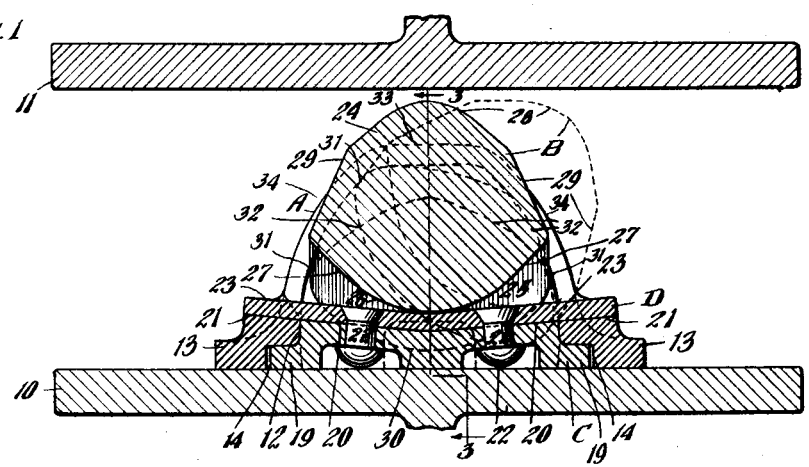
Figure 2:
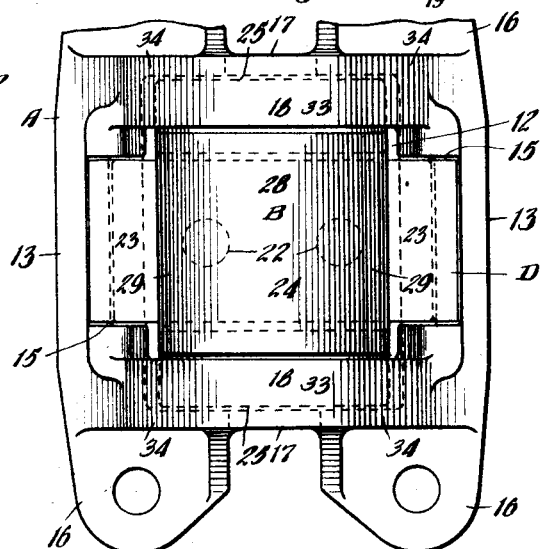
Figure 3:
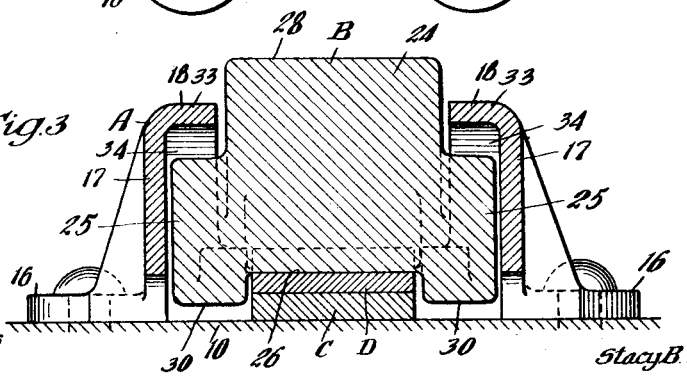

In the drawing forming a part of this specification, Figure 1 is a vertical, sectional view taken lengthwise of the car through the ends of the body and truck bolsters and showing my improvements in connection therewith. Figure 2 is a top plan view of the bearing proper shown in Figure 1. And Figure 3 is a vertical, sectional view corresponding to the section line 3—3 of Figure 1.

In said drawing, 10 denotes the upper portion of a truck bolster and 11 the underside of the opposed body bolster of a railway car. The improved bearing is shown applied to the truck bolster and comprises, broadly, a retaining member A; an anti-friction element proper B; a supporting table or block C; and a bearing plate D.

The retaining member A, preferably in the form of a malleable casting, has a bottom in which is provided a rectangular opening 12. The end sections 13—13, defining said opening, are undercut, or rabbeted as indicated at 14 for the purposes hereinafter described, and on the top faces said end sections 13 are recessed as indicated at 15 to accommodate the ends of the wear plate D and prevent the latter from any appreciable shifting laterally, as hereinafter more fully explained. On each side, the bottom of the retaining member A is laterally extended to provide four corner lugs 16—16 which are suitably perforated to accommodate the attaching rivets, or other securing means. Also, on each side of the opening 12, the retaining member A is provided with upstanding vertical side walls 17—17, the latter having oppositely and inwardly extending overhanging flanges 18 providing therewithin recesses of special contour as hereinafter described.

The supporting block or table C is provided at each end thereof with flanges 19—19 which enter the recesses 14 above described so that, when said block is entered from the bottom of the retaining member A, the retaining member A will hold said block C against movement transverse of the bolster. The top of the block C is provided with two flat surfaces 20—20, the same being inclined upwardly and oppositely from the center of the block as clearly indicated in Figure 1, the planes of said surfaces 20 co-inciding with the planes of the top surfaces 21 of the end sections 13 of the retaining member A. The hardened wear plate D is applied to the top of the block C and the surfaces 21 of the retaining member A, the ends of said plate D entering said recesses 15 hereinbefore referred to. When the plate D is secured to the block C as by the rivets 22, it is evident that the block is held against lateral movement with respect to the retaining member A, and, furthermore. all of the parts will be held in assembled relation. The top surfaces 23—23 of the plate D are flat and they also are inclined upwardly and oppositely from the center of the bearing as shown in Figure 1.

The anti-friction element proper B consists of a main central section 24 and two overbalancing or counter-weight wings 25—25, one at each end thereof integral therewith. The main central section 24, at the bottom, is provided with a centrally disposed circular bearing surface 26 of comparatively long radius, the ends of said surface 26 merging into tangential flat surfaces 27—27. The lower bearing surface of the element B, just described, is such that, when the element B has reached either end of its intended travel, one or the other of the flat surfaces 27 thereof will be in surface contact with the corresponding flat surface 23 of the plate D, thereby limiting the rolling movement of the element B, as will be obvious. At its top, the element B is provided with a centrally disposed, double, irregularly curved bearing surface 28 so generated that, as the element B is rolled to either side of its normal central position and rises on either of the inclined flat bearing surface 23, the consequent elevation of the element B is compensated for by a corresponding lowering of the bearing surface 28 so that the effective height of the side bearing will remain constant in all positions of the element B. The sides of the element B between the ends of the upper bearing surface 28 thereof and the lower flat bearing surfaces 27 are left flat as indicated at 29. The longitudinal dimension of the main section 24 of the element B is made such that it will rock freely between the opposed edges of the flanges 18 of the member A, as clearly shown in Figure 3.

Each of the wings 25, as shown, depends partially below the lowermost point of the bearing surface 26 so that said wings 25 may be said to straddle the bearing plate D and supporting block C, as clearly shown in Figure 3. Each wing 25 is accommodated in corresponding guide recess provided by a flange 18. The lower surface of each wing 25 is rounded as indicated at 30 on a comparatively long radius. At each end, the surface 30 merges into two other rounded surfaces 31—31 of comparatively short radius. From the short radius surfaces 31, the upper periphery of the wing 25 is defined by upwardly converged and finally intersecting curved surfaces 32—32, each struck on a relatively long radius. With this contour, each of the wings 25 has somewhat the appearance of an elipse, as viewed in side elevation and shown best in Figure 1.

The inturned flanges 18 of the retaining member A are designed to co-operate with the wings 25 and to prevent bodily shifting of the element B with respect to the retaining member A, but at the same time permitting free rolling action of the member B. To this end, each flange 18 has a top flat central section 33 and two curved, downwardly extending opposite side sections 34—34, the inner surfaces of which are of such conformation that, at all points in the travel of the anti-friction element, the wings 25 are thereby closely guided, bodily shifting of the element transversely of the bolster being thus prevented. In actual practice, when the element B is in normal position, a slight clearance will be left between the rounded ends 31—31 of the wings and the corresponding adjacent flange sections 34—34, and, when the element B is in an extreme position as indicated by the dotted lines in Figure 1, one end 31 of each wing will be disposed in the corner defined by the intersections of the horizontal portions 33 and side portions 34 of the flanges 18. Correspondingly, one of the curved surfaces 32 of each wing will lie against the corresponding side section 34 of the flange 18. Thus, the wings 25 co-acting with the flanges 18 serve as an additional safeguard to prevent excessive rocking movement of the element B.

From the preceding description, considered in connection with the drawing, it will be observed that, when the element B is in an extreme position, the center of weight of the central portion 24 of the element B will lie in a vertical line between the effective point of contact between the element B and the plate D and the center of the bearing so that said section 24, considered alone, is in a position of unstable equilibrium and therefore automatically operative to return to central position when free from the load. Also, it will be noted that the element B is on the inclined plane so that the element B is additionally influenced to return to central normal position by reason of its tendency to roll down the inclined bearing surface. Furthermore, the counterweight or over-balancing wings 25 have their centers of weight disposed between the center line of the bearing and the line passing through the point of contact of the element B and bearing plate D, when the element B is in an extreme position, so that said counter-weights are in a position of unstable equilibrium and automatically effective to assist in the return of the element B to central position.

The bearing which I have shown and described consists of few parts, each of which may be manufactured at comparatively small expense. The element B cannot shift or be shifted bodily with respect to the retaining member A so that the desired predetermined relation between the retaining member and the element B is always maintained.

I have herein shown and described what I now consider the preferred manner of carrying out my invention, but the same is merely illustrative and I contemplate all changes and modifications that come within the scope of the claims appended hereto.

I claim:

1. In an anti-friction bearing, the combination with a retaining member provided with a load-supporting bearing surface, the latter comprising two surface portions symmetrically arranged with respect to the center and both inclined upward from the center; of a gravity self-centering anti-friction element proper adapted to roll to either side of central normal position on said bearing surface, the upper and lower bearing surfaces of said element being so formed that the distance between the top and bottom bearing portions of the anti-friction element on the load line, as the anti-friction element assumes different positions in its rolling movement towards the end of the retaining member, is diminished in proportion to the rise of the load-supporting bearing surface.

2. In an anti-friction bearing, the combination with a retaining member provided with a bearing surface, the latter comprising two flat surface portions symmetrically arranged with respect to the center and both inclined from the horizontal; of a gravity self-centering anti-friction element proper adapted to roll to either side of central normal position on said bearing surface, the upper and lower bearing surfaces of said element being so formed as to compensate for the inclination of said bearing surface of said member and thereby maintain a constant effective height of the element, said bearing surface of said element which is arranged to engage said bearing surface of said member having flat end portions adapted to assume surface contact, with the bearing surface of said member at either end of the rolling movement of said element, to thereby limit the movement of said element with respect to said member.

3. In an anti-friction bearing, the combination with a retaining member provided with a bearing surface, the latter comprising two surface portions symmetrically arranged with respect to the center and both inclined upward from the center; of a gravity self-centering anti-friction element proper adapted to roll to either side of central normal position on said bearing surface, the upper and lower bearing surfaces of said element being so formed that the distance between the top and bottom bearing points of the anti-friction element on the load line, as the anti-friction element assumes different positions in its rolling movement towards the end of the retaining member, is diminished in proportion to the rise of the said bearing surface portions, and over-balancing centering wings on the ends of said element, said retaining member having guide recesses co-operable with and receiving said wings.

4. In a side bearing for railway cars, the combination with a retaining member adapted to be secured to a truck bolster, said member having a central opening in the bottom and vertically extending side walls, each of the latter being provided on its inner face with a guide recess; of a bottom bearing in said retaining member; and an anti-friction element adapted for rolling movement on said bearing surface to either side of central normal position, said element being provided at each end thereof with a wing received within and co-operating with one of said guide recesses, each of said wings depending below the lowermost point of the bearing surface of said element and below the said bearing surface of said member, the bearing surface of said member comprising two flat surfaces extending oppositely and upwardly from the center of the bearing, and the lower bearing surface of said element co-operable therewith having flat end portions adapted to assume surface contact with said bearing surface of said member at the extreme end of movement of said element in either direction.

5. In a side bearing for railway cars, the combination with a retaining member adapted to be secured to a bolster, said retaining member being provided with a bearing surface comprising two flat surface portions symmetrically arranged with respect to the center but inclined from the horizontal; of a gravity self-centering anti-friction element properly adapted to roll to either side of central normal position on said bearing surface, the upper and lower bearing surfaces of said element being so formed as to compensate for the inclination of said bearing surface of said member and thereby maintain a substantially constant effective height of the element, said bearing surface of said element which is arranged to engage the said bearing surface of said member having flat end portions adapted to assume surface contact with the bearing surface of said member at either end of the rolling movement of said element, said member having also side walls provided on the inner faces with guide recesses and said element having a wing at each end thereof received within and co-operating with said guide recesses, said wings engaging the top portions of said guide recesses and one of the side portions of each of said guide recesses substantially at the same time as said flat end portions assume said surface contact with the bearing surface.

6. In an anti-friction bearing, the combination with a retaining member provided with a load-transmitting bearing surface, said surface being inclined in both directions from the center; of an anti-friction element proper adapted to roll to either side of normal central position and having a peripheral bearing surface engaging the first-named bearing surface, the bearing surface of said element being so formed as to compensate for the inclination of said first-named bearing surface and thereby maintain a constant effective height of said element, the inclined portions of said first bearing surface serving to center said element under the influence of gravity.

7. In an anti-friction bearing, the combination with a retaining member provided with a concave load-transmitting bearing surface; of an anti-friction element proper adapted to roll either side of normal central position and having a peripheral bearing surface engaging the first named bearing surface, the bearing surface of said element being so formed as to compensate for the inclination of said first named bearing surface and thereby maintain a constant effective height of said element during its movements; and means interconnecting said anti-friction element and said retaining member for maintaining the proper relation between the co-operating bearing surfaces of said retaining member and said anti-friction element.

8. In a side bearing for railroad cars, an open top casing, a bearing plate in said casing inclined from the middle of the casing upwardly towards the ends of the casing, an antifriction roller capable of rolling movement on said bearing plate, said roller being in cross section wide at the bottom and narrow at the top, top and bottom bearing surface of said roller being so formed that the distance between the top and bottom bearing points of the roller on the load line as the roller assumes different positions in its rolling movement towards the end of the casing is diminished in proportion to the rise of the bearing plate, and interengaging parts on said roller and said casing to guide the roller in its rolling movement.

In witness that I claim the foregoing I have hereunto subscribed my name this 8th day of September, 1923.

STACY B. HASELTINE